(12) United States Patent
Iwabayashi et al.

(10) Patent No.: US 7,961,336 B2
(45) Date of Patent: Jun. 14, 2011

(54) IMAGE FORMING APPARATUS, AN IMAGE FORMING METHOD, AND AN IMAGE FORMING PROGRAM

(75) Inventors: Kazuya Iwabayashi, Tenri (JP); Yusuke Nagano, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 1103 days.

(21) Appl. No.: 10/557,367

(22) PCT Filed: May 19, 2004

(86) PCT No.: PCT/JP2004/006740
§ 371 (c)(1),
(2), (4) Date: Nov. 17, 2005

(87) PCT Pub. No.: WO2004/103716
PCT Pub. Date: Dec. 2, 2004

(65) Prior Publication Data
US 2007/0009154 A1 Jan. 11, 2007

(30) Foreign Application Priority Data
May 21, 2003 (JP) .................................. 2003-144073

(51) Int. Cl.
*G06F 3/12* (2006.01)
(52) U.S. Cl. .......... 358/1.13; 358/1.14; 399/88; 399/85; 399/70; 399/37; 713/320; 713/300; 713/323
(58) Field of Classification Search .................. None
See application file for complete search history.

(56) References Cited

U.S. PATENT DOCUMENTS

| | | | | | |
|---|---|---|---|---|---|
| 5,321,478 | A | * | 6/1994 | Nakamura et al. | 399/70 |
| 5,566,340 | A | * | 10/1996 | Stewart et al. | 713/323 |
| 5,974,284 | A | * | 10/1999 | Sato et al. | 399/76 |

FOREIGN PATENT DOCUMENTS

| | | |
|---|---|---|
| JP | 6-6496 A | 1/1994 |
| JP | 2000-151863 A | 5/2000 |
| JP | 2000-184106 A | 6/2000 |
| JP | 2001-285543 A | 10/2001 |

* cited by examiner

*Primary Examiner* — Benny Q Tieu
*Assistant Examiner* — Paul F Payer
(74) *Attorney, Agent, or Firm* — Birch, Stewart, Kolasch & Birch, LLP

(57) ABSTRACT

Recording of time information and function information of each image forming process for which processing has been completed in a recording portion 64 (S1), judgment (S6) of whether or not a switching time that has been set is 0 for processing in which the elapsed time from completion to the present time is within a predetermined time for processing among the information in the recording portion (64), calculation (S7) of a time (T) in which the switching time is added to the completion time of each image forming process, comparison (S8) of the time (T) and a time information (Tmax), and update (S9) of the time information (Tmax) by the time (T) when the calculated time (T) is later than the time information (Tmax) are repeatedly executed, and the latest time is set to the time information (Tmax). Switching is made to a power-saving mode when a counter (66) has timed the time information (Tmax).

6 Claims, 7 Drawing Sheets

| FUNCTION TYPE | POWER CONSUMPTION EFFICIENCY | IMAGE FORMING TIME | QUALITY GIVEN PRIORITY | SWITCHING TIME |
|---|---|---|---|---|
| COPY FUNCTION | POOR | FAST | CONVENIENCE | LONG |
| PRINTER FUNCTION | MEDIUM | MEDIUM | CONSUMPTION EFFICIENCY／CONVENIENCE | MEDIUM |
| FAX FUNCTION | GOOD | SLOW | CONSUMPTION EFFICIENCY | SHORT |

FIG. 2

| FUNCTION TYPE | POWER CONSUMPTION EFFICIENCY | IMAGE FORMING TIME | QUALITY GIVEN PRIORITY | SWITCHING TIME |
|---|---|---|---|---|
| COPY FUNCTION | POOR | FAST | CONVENIENCE | LONG |
| PRINTER FUNCTION | MEDIUM | MEDIUM | CONSUMPTION EFFICIENCY / CONVENIENCE | MEDIUM |
| FAX FUNCTION | GOOD | SLOW | CONSUMPTION EFFICIENCY | SHORT |

FIG. 3

| ELAPSED TIME | FUNCTION TYPE |
|---|---|
| 0 : 0 1 : 2 4 | FAX FUNCTION |
| 0 : 0 3 : 1 2 | COPY FUNCTION |
| 0 : 0 7 : 4 3 | FAX FUNCTION |
| 0 : 1 1 : 1 1 | FAX FUNCTION |
| 0 : 1 2 : 5 8 | PRINTER FUNCTION |
| 0 : 1 8 : 0 3 | COPY FUNCTION |
| 0 : 2 1 : 3 8 | FAX FUNCTION |
| 0 : 2 9 : 2 4 | COPY FUNCTION |
| 0 : 3 5 : 1 8 | FAX FUNCTION |
| 0 : 4 2 : 4 0 | COPY FUNCTION |

| FUNCTION TYPE | SWITCHING TIME AFTER PROCESSING COMPLETION | SWITCHING TIME AFTER OCCURRENCE OF OPERATION |
|---|---|---|
| COPY | 300 | 120 |
| PRINT | 30 | 0 |
| CONFIDENTIAL PRINT | 180 | 120 |
| RECEIVE FAX | 10 | 0 |
| RECEIVE CONFIDENTIAL FAX | 180 | 120 |
| SCAN | 0 | 0 |
| SEND FAX | 0 | 0 |
| SEND CONFIDENTIAL FAX | 0 | 0 |

(B)

| FUNCTION TYPE | SWITCHING TIME AFTER OCCURRENCE OF OPERATION | SWITCHING TIME AFTER OCCURRENCE OF OPERATION |
|---|---|---|
| IMAGE FORMATION (OPERATION NECESSARY) | 300 | 120 |
| IMAGE FORMATION (OPERATION NOT NECESSARY) | 30 | 0 |
| OTHER | 0 | 0 |

IMAGE FORMING APPARATUS, AN IMAGE FORMING METHOD, AND AN IMAGE FORMING PROGRAM

TECHNICAL FIELD

The present invention relates to an image forming apparatus such as a multifunction printer (hereinafter, referred to as "MFP") or facsimile in which a power-saving mode is executable.

BACKGROUND ART

Conventionally, in image forming apparatuses such as MFPs that perform image forming process based on a plurality of types of functions such as a copy function, a printer function, and a facsimile function, a configuration is adopted in which, when work has continuously not been performed for a predetermined time, it is possible to execute a power-saving mode in which the power consumption during standby is decreased by cutting off the power supply to each portion of the device. Specifically, in an image forming apparatus that performs electrophotographic image forming process, the control temperature of a fixing device, which has a comparatively high power consumption, is switched to a temperature lower than the melting temperature of toner during the power-saving mode. Accordingly, when executing the power-saving mode, it is not possible to immediately begin the next image forming process, and image forming process is begun after waiting for completion of a return processing that raises the temperature of the fixing device to the toner melting temperature.

Here, among the image forming process based on the plurality of types of executable functions in an image forming apparatus such as an MFP, in the image forming process of an ordinary print function or fax function, each image forming process request is independently generated, user operation of the image forming apparatus before the start of processing is not made necessary, and so it is not necessary for the user to go to the installation location of the image forming apparatus. Accordingly, even when switching to the power-saving mode immediately after the image forming process of the printer function or the fax function has been completed, the convenience of the user is not impaired.

However, when performing image forming process in which user operation of the image forming apparatus is necessary before starting processing, such as the image forming process of the copy function, it is possible to intermittently perform a plurality of image forming processing that sandwiches operation of the device by a single user such as setting of copy conditions and document exchange. Thus, when the time after the image forming process is complete until switching is made to the power-saving mode is short, it is necessary to wait for completion of the return processing whenever starting the next image forming process.

In consideration of such points, image forming apparatuses have been proposed in which the switching time, which is the time from completion of the image forming process until switching to the power-saving mode, is determined according to the type of the function in the immediately previous image forming process and the connection status of the host device (see patent documents 1 and 2).

However, in conventional image forming apparatuses in which the switching time is determined according to the function of the image forming process that was executed immediately before, when a plurality of different types of image forming process are executed in parallel, or when a plurality of different types of image forming process have been generated in tandem, there is the problem that the determined switching time is not a logical amount of time, leading to a decrease in the user's convenience and work efficiency.

For example, when fax transmission data or print data is received during image forming process of the copy function for a plurality of document sets and image forming process has been executed for data received at the point in time that image forming process of the copy function for a single set of documents was completed, the final image forming process becomes image forming process of the facsimile function or the printer function, and while the user is performing operation of the device such as preparation of a document set for the next image forming process of the copy function or operation to set copy conditions, the device switches to the power-saving mode in a comparatively short amount of time after the time that image forming process of the received data is completed, and it is possible that without being able to perform the next image forming process of the copy function immediately at the point in time that the user completed operation of the device, the user will be unable to smoothly perform image forming process of the copy function for a plurality of document sets.

It is an object of this invention to provide an image forming apparatus in which it is possible to realize effective power-saving without impairing the convenience of the user, by determining the timing for switching to a power-saving mode based on historical information of, for example, image forming process or operation related to image forming process.

Patent document 1: JP 2000-184106A
Patent document 2: JP 2000-151863A

DISCLOSURE OF INVENTION

This invention is provided with the following configurations as a means for solving the problems described above.

(1) A configuration of this invention includes:

an image forming portion that alternatively executes image forming process for a function for which operation of the device before starting processing is necessary and image forming process for a function for which operation of the device before starting processing is not necessary, a control circuit that switches the state of the power supply to at least the image forming portion from a processing operation mode to a power-saving mode when a switching time that has been set in advance has elapsed since the completion time of the image forming process, and a recording circuit that records time information in which a processing execution time for each executed image forming process is specified and function information in which a function corresponding to the processing is specified, wherein the control circuit sets the switching time based on the function information of the image forming process among the image forming process recorded in the recording circuit for which the time information is within a predetermined time period.

In this configuration, time information in which an execution time for each executed image forming process is specified and function information in which a function corresponding to that processing is specified are recorded in a recording circuit, and when image forming process is completed, at least the power supply state of the image forming portion switches to the power-saving mode when the switching time that has been set based on the function information of the image forming process executed from the present time to a predetermined time earlier has elapsed.

Accordingly, the switching time from the completion of each image forming process to the power-saving mode is set based on a history of image forming process that takes into consideration function differences, and the usage conditions of the image forming apparatus from the user are reflected in the settings for the switching time.

Thus, if the execution frequency of image forming process for a function for which operation of the device before starting processing is necessary is high, when image forming process for a function for which operation of the device before starting processing is not necessary is completed, a switching time is set that corresponds to image forming process for a function for which operation of the device before starting processing is necessary.

Based on a history of image forming process that takes into consideration function differences, it is possible to set the switching time from the completion of each image forming process to the power-saving mode, and the usage conditions of the image forming apparatus from the user can be reflected in the settings for the switching time. Thus, it is possible to control power-saving without impairing the convenience of the user.

(2) The control circuit sets the switching time based on the number of executions by function of the image forming process for which time information recorded in the recording circuit is within a predetermined time period.

In this configuration, when the image forming process completes, switching is made to the power-saving mode when a switching time set in consideration of the number of executions by function from the current time to a predetermined time earlier has elapsed.

Based on a history of image forming process that takes into consideration the number of executions of image forming process by function, it is possible to set the switching time from the completion of each image forming process to the power-saving mode, and the usage conditions of the image forming apparatus from the user by function can be reflected in the settings for the switching time. Thus, it is possible to control power-saving without impairing the convenience of the user.

(3) The control circuit sets the switching time based on the number of executions of the image forming process among the image forming process recorded in the recording circuit for which the time information is within a predetermined time period and that is for a function for which operation of the device before starting processing is necessary.

In this configuration, when the image forming process completes, switching is made to the power-saving mode when a switching time from the current time to a predetermined time earlier, set in consideration of the number of executions of image forming process for a function for which operation of the device before starting processing is necessary, has elapsed.

Based on a history of image forming process that takes into consideration the number of executions of image forming process for a function for which operation of the device before starting processing is necessary it is possible to set the switching time from the completion of each image forming process to the power-saving mode, and the usage conditions of the image forming apparatus from the user with respect to a function for which operation of the device before starting processing is necessary can be reflected in the settings for the switching time. Thus, it is possible to control power-saving without impairing the convenience of the user.

(4) A switching time is set for each function of the image forming process, the control circuit calculates the switching time that switching should be made to the power-saving mode from the switching time corresponding to the function information for each image forming process and the time information recorded in the recording circuit, and switching is made to the power-saving mode when the latest switching time among the calculated switching times has been reached.

In this configuration, when the image forming process completes, a switching time that switching should be made to the power-saving mode is calculated for each image forming process executed up to that point in time, and the latest switching time is selected as the time that switching should be made to the power-saving mode.

Based on a history of image forming process that takes into consideration the execution times of a plurality of image forming process, it is possible to determine the time to switch to the power-saving mode. Thus, it is possible to more accurately determine the timing at which switching should be made to the power-saving mode after completion of the image forming process.

(5) The control circuit sets different switching times for each function of the image forming process.

In this configuration, when the image forming process completes, a switching time at which switching should be made to the power-saving mode is calculated from switching times and execution times that differ for each image forming process executed up to that point in time, and the latest switching time is selected as the time that switching should be made to the power-saving mode.

Based on a history of image forming process that takes into consideration the processing time of each completed image forming process and the execution times of a plurality of image forming process, it is possible to determine the time to switch to the power-saving mode. Thus, even when image forming process with a short switching time has been completed immediately after image forming process with a long switching time has been completed, it is possible to make the longer switching time effective, and the convenience of the user can be improved.

(6) The switching time is set for each operation of the device before the start of processing, a detection member is provided that detects operation of the device before the start of processing, the recording circuit also stores operating time information in which a time of operating occurrence for each operation detected by the detection member is specified, and the control circuit also calculates the switching time at which switching should be made to the power-saving mode from the switching time corresponding to each operation and the operating time information recorded in the recording circuit.

In this configuration, when the image forming process has completed, and when the device has been operated, the switching time at which switching should be made to the power-saving mode is calculated from execution times and switching times that differ for each operation of the device and each image forming process executed up to that point in time, and the latest switching time is selected as the time that switching should be made to the power-saving mode.

It is possible to determine the timing at which switching should be made to the power-saving mode in consideration of not only a history of the completed image forming process, but also a history of the operation of the device, and thus the convenience of the user can be further improved.

BRIEF DESCRIPTION OF DRAWINGS

FIG. 2 shows the properties and the switching time setting state of each function of the image forming process in the aforementioned MFP.

FIG. 3 shows an example of the recorded contents of the time information and the function information of each image forming process in a recording circuit of the aforementioned MFP.

FIG. 6 shows the switching time setting state of each image forming process in the aforementioned MFP.

BEST MODE FOR CARRYING OUT THE INVENTION

Figure 1:
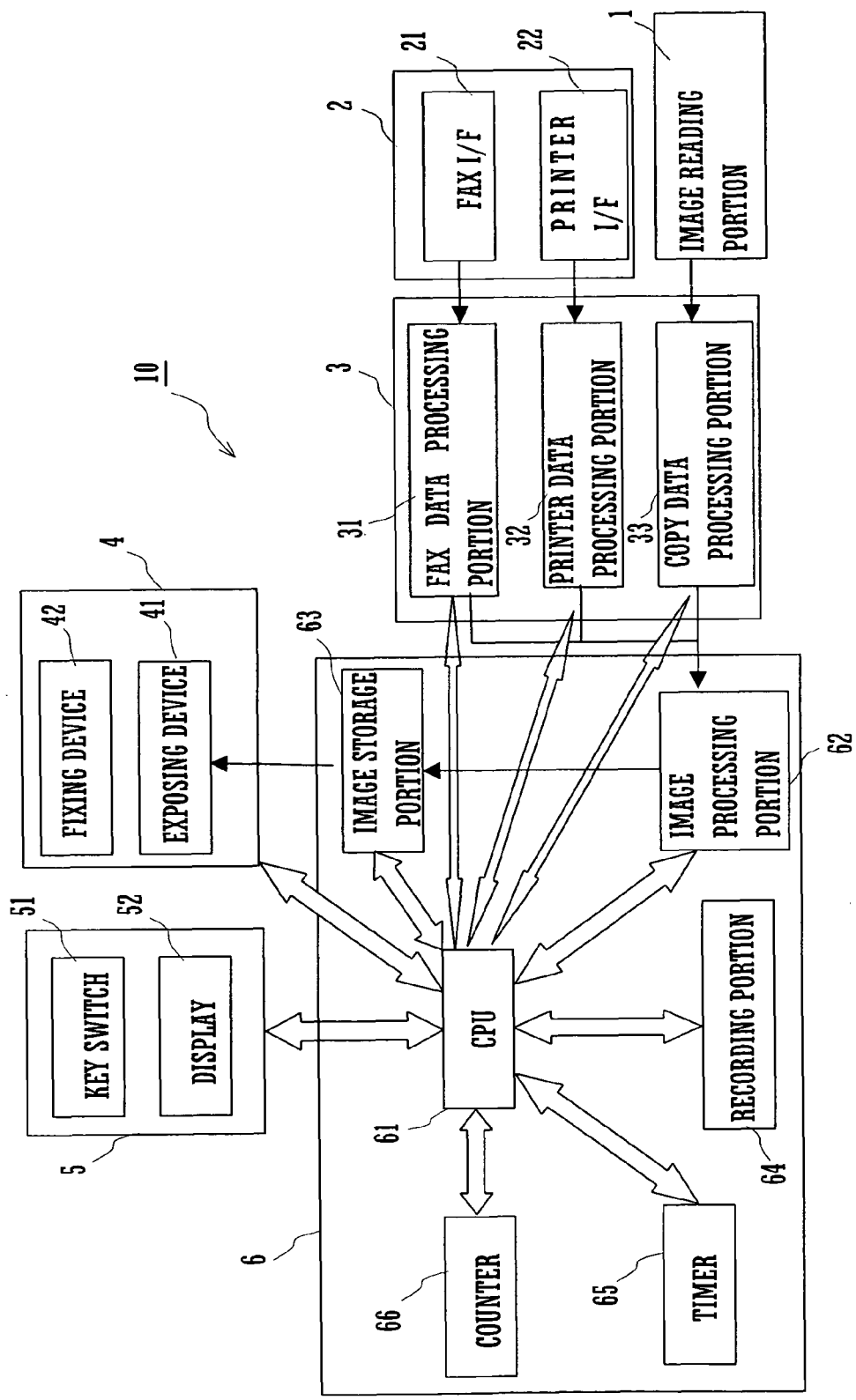
FIG. 1 is a block diagram that shows a configuration of an MFP that is an image forming apparatus according to an embodiment of this invention.

FIG. 1 is a block diagram that shows a configuration of an MFP that is an image forming apparatus according to an embodiment of this invention. An MFP 10 includes an image reading portion 1, a data input portion 2, a data processing portion 3, an image forming portion 4, an operating portion 5, and a control portion 6, and executes image forming process for a copy function, a printer function, and a fax function.

The image reading portion 1 reads an image of a document when the copy function is executed and outputs an image signal. The data input portion 2 includes a fax interface 21 that receives fax data sent from an external facsimile via a public telephone network, and a printer interface 22 that receives print data sent from a terminal device such as a personal computer via a LAN or the like.

The data processing portion 3 includes a fax data processing portion 31 that deploys fax data received by the fax interface 21 as image data, a print data processing portion 32 that deploys print data received by the printer interface 22 as image data, and a copy data processing portion 33 that converts the image signal output from the image reading portion 1 into image data.

The image forming portion 4 includes an exposing device 41 that irradiates light modulated by image data to the surface of a photosensitive body, and a fixing device 42, and forms an image on paper based on the image data by performing electrophotographic image formation. The operating portion 5 includes a key switch 51 that receives input of image forming conditions such as an image forming magnification or the number of image forming pages, or an instruction to start image forming process, and a display 52 that displays guidance for operation of the image forming apparatus or the status of the image forming apparatus.

The control portion 6 includes a CPU 61, an image processing portion 62, an image storing portion 63, a recording portion 64, a timer 65, and a counter 66. The image processing portion 62 performs image processing such as filter or edge processing for the image data output from the data processing portion 3. The image storage portion 63 temporarily stores image data for which image processing has been performed. The storage portion 64 is a recording circuit of this invention, and records information for determining the timing for switching to the power-saving mode. The timer 65 keeps track of the present time. The counter 66 measures the switching time interval that has been set.

The CPU 61 is a control circuit of this invention, supervises and controls the image reading portion 1, the data input portion 2, the data processing portion 3, the image forming portion 4, and the operating portion 5, and performs image forming process of the copy function, the printer function, and the fax function. When a start key operation signal is input from the operating portion 5, the CPU 61 reads an image of a document on a document rest by operating the image reading portion 1, performs predetermined image processing of the image data by operating the image processing portion 62 after converting the image to image data by operating the copy data processing portion 33, and after storing the image data following image processing in the image storage portion 63, supplies the image data to the exposing device 41 of the image forming portion 4 and performs the image forming process of the copy function.

When print data is input via the printer interface 22, image data, for which predetermined image processing has been performed by the image processing portion 62 after being deployed by the print data processing portion 32, is supplied to the exposing device 41 of the image forming portion 4 after being stored in the image storage portion 63, and image forming process of the printer function is performed. When fax data is input via the fax interface 22, image data, for which predetermined image processing has been performed by the image processing portion 62 after being deployed by the fax data processing portion 32, is supplied to the exposing device 41 of the image forming portion 4 after being stored in the image storage portion 63, and image forming process of the fax function is performed.

In the image forming process for any of the functions, paper is transported to the image forming portion 4 by operating a paper transport portion not shown in the figures, at a timing synchronized with the exposure to the surface of the photosensitive body of the writing light modulated with image data by the exposing device 41 of the image forming portion 4. In the image forming portion 4, a latent electrostatic image formed on the surface of the photosensitive body by the exposure of writing light by the exposing device 41 is manifested into a toner image. The paper is heated and pressurized by the fixing device 42 after the toner image is transferred from the surface of the photosensitive body, fixing the toner on the surface of the paper. Thus, an image is formed on the paper based on the image data.

After the image forming process for any of the functions is completed, when a standby state in which the start key operation or the input of print data or fax data are not performed continues for a predetermined period of time, the CPU 61 switches the state of the power supply to the MFP 10 from a normal power mode in which image forming process can be immediately executed to a power-saving mode.

For example, in the fixing device 42, which is the equipment with the largest amount of power consumption in the MFP 10, the power supply is controlled such that in the normal power mode the temperature of the fixing device 42 is kept at about 180° C., at which it is possible to melt toner, and in the power-saving mode the control temperature of the fixing device 42 is set at a low temperature of about 120° C., or the power supply to the fixing device 42 is suspended. When the next image forming process is begun following a switch to the power-saving mode, after the state of the power supply to the MFP 10 has returned to the normal power mode it is necessary to wait for the temperature of the fixing device 42 to rise to the temperature at which it is possible to melt toner.

Here, the time that should be set as the switching time at which switching is made to the power-saving mode after completion of the image forming process differs for each function in the image forming process. This is because the status of image data input differs for each function. That is, in the image forming process of the copy function, which makes user operation of the MFP 10 prior to the start of processing necessary, it is possible to intermittently perform a plurality of image forming processing that sandwiches operation of the device by a single user such as setting of image formation conditions and document exchange, and when the switching time elapses in the interval from completion of the image forming process until the start of the next image forming process, and the MFP 10 switches to the power-saving mode, it is not possible to start image forming process immediately after the user completes operations for setting image formation conditions, document exchange, and the like.

On the other hand, in the image forming process of a printer function performed based on image data output from a terminal device such as a personal computer, the user only goes to the installation location of the MFP 10 and obtains paper for which image forming process is complete, and in principal the MFP 10 is not directly operated by the user. Further, in the image forming process of a fax function performed based on image data output from a facsimile, a user who has created image data almost never goes to the installed location of the MFP 10.

For the above reasons, as shown in FIG. 2, a sufficiently long switching time should be set in the image forming process of the copy function, giving priority to the convenience of the user. On the other hand, a sufficiently short switching time should be set in the image forming process of the fax function, giving priority to the power consumption efficiency over the convenience of the user. Also, a switching time of intermediate length should be set in the image forming process of the printer function, in consideration of the convenience of the user and the power consumption efficiency.

Further, the respective frequencies of execution of the image forming process of the copy function, the image forming process of the printer function, and the image forming process of the fax function in the MFP 10 are not uniform; the frequency of execution of the image forming process of one of the functions becomes more than the frequency of execution of the image forming process of the other functions depending on the circumstances of the installation of the MFP 10. Thus, for example, when fax data is input in an MFP 10 in which the image formation operation of the copy function is exclusively executed and switching is made to the power-saving mode after a sufficiently short switching time elapses following completion of the image forming process of the fax function, it is not possible for a user who has next gone to the MFP 10 to immediately start the image forming process of the copy function.

Consequently, in the MFP according to an embodiment of this invention, as shown for example FIG. 3, a history of time information in which a processing execution time is specified for each image forming process executed and function information in which a corresponding function is specified is stored in the recording portion 64. In the example shown in FIG. 3, as time information in which a processing execution time is specified for each image forming process executed, the time that elapses from completion of each image forming process until the present time is recorded in an updated manner.

The CPU 61 refers to the recorded contents of the recording portion 64 whenever the image forming process is completed or started, and determines the switching time with reference to a function in the image forming process for which execution is complete, whose elapsed time from the time that processing is completed or started until the present time is within a predetermined period of time. For example, when different switching times have been determined in advance for each of the image forming process of the copy function, the image forming process of the printer function, and the image forming process of the fax function, the CPU 61 classifies a plurality of image forming process for which execution is complete, whose elapsed time until the present time is within a predetermined period of time, into the functions of the copy function, the printer function, and the fax function, and switches to the power saving mode when the switching time that has been determined in advance for the function executed the most times has elapsed.

When a different switching time has been determined in advance for each of the image forming process in which operation of the MFP 10 before the start of processing is necessary (the copy function) and the image forming process in which operation of the MFP 10 before the start of processing is not necessary (the printer and fax functions), the CPU 61 classifies the processing into functions in which operation of the MFP 10 before the start of processing is necessary and functions in which operation of the MFP 10 before the start of processing is not necessary, and switches to the power saving mode when the switching time that has been determined in advance for the function executed the most times has elapsed.

Also, if the image forming process of the copy function has been executed such that the elapsed time from the completion time or the start time of processing until the present time is within a predetermined time interval, the CPU 61 can also switch to the power-saving mode when a comparatively long switching time that has been set in advance for the image forming process of the copy function has elapsed when the image forming process of the printer function or the image forming process of the fax function, for which a comparatively short switching time has been set in advance, is completed.

Further, the CPU 61 can increase or decrease the switching time according to the execution frequency by function of the image forming process for which the elapsed time from the time that processing is completed or started until the present time is within a predetermined period of time. For example, the switching time is made longer when the execution frequency of the image forming process of the copy function is high, and the switching time is made shorter when the execution frequency of the image forming process of the copy function is low.

Figure 4:
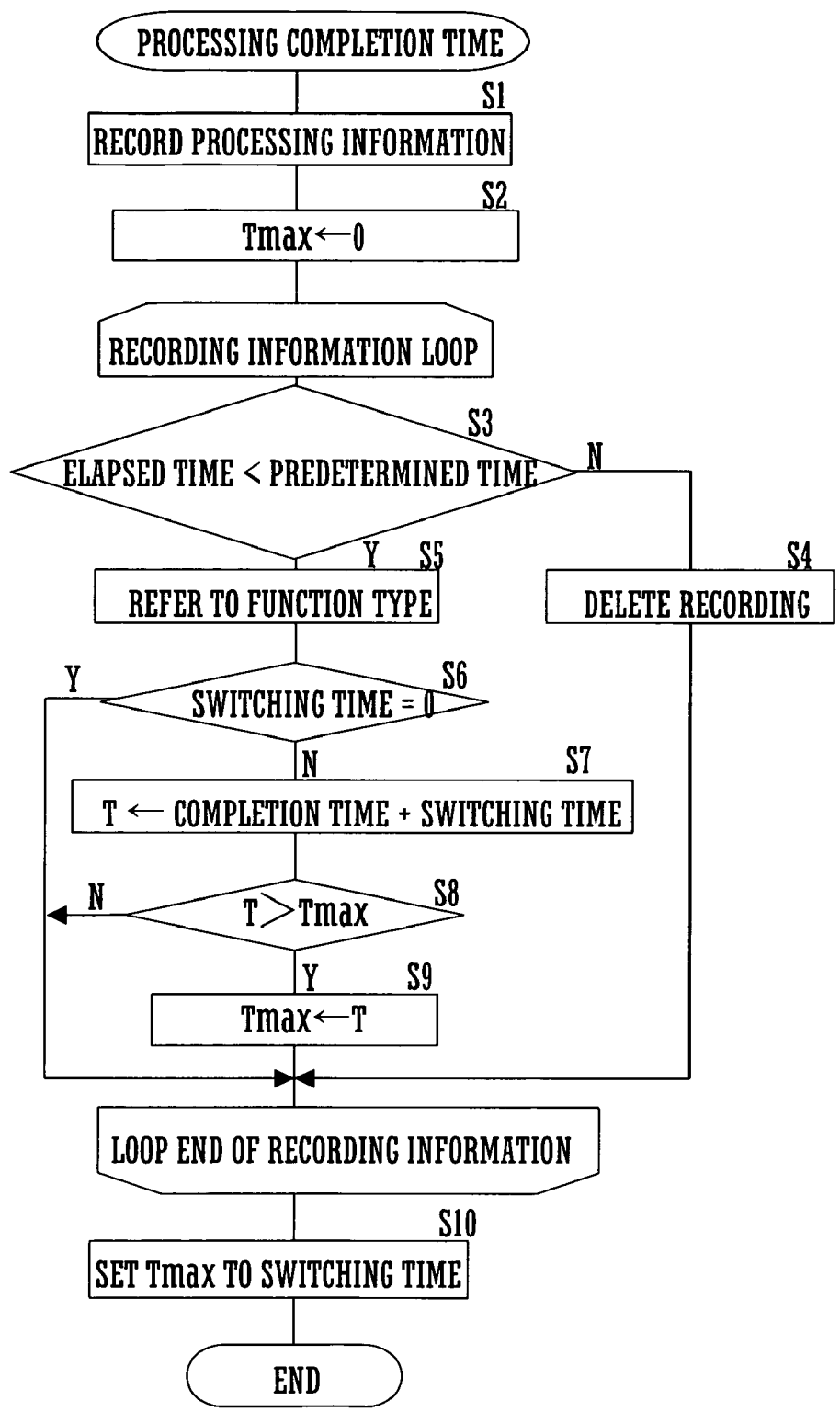
FIG. 4 is a flowchart that shows part of the processing procedure in a control circuit of the aforementioned MFP.

FIG. 4 is a flowchart that shows part of the processing procedure in a control circuit of an image forming apparatus according to another embodiment of this invention. The CPU 61 of the MFP 10 which is an image forming apparatus according to this embodiment records time information and function information of completed image forming process in the recording portion 64 when image forming process is complete (S1), and sets the contents of a time information Tmax to 0 (S2). The time information Tmax is assigned to a predetermined memory area of RAM that is not shown in the figures, and stores the latest time as the switching time that is the timing to switch to the power-saving mode.

Afterwards, the CPU 61 judges whether or not the elapsed time from the completion time to the present time for the image forming process for which execution is complete that has been stored in the recording portion 64 is within a predetermined time period (S3), and deletes information for that image forming process from the recording portion 64 when the elapsed time exceeds the predetermined time period (S4).

When the elapsed time from the completion time until the present time is recorded in an updated manner as the time information of each image forming process in the recording portion 64, the CPU 61 reads that time information when performing the processing of S3. Also, when the completion time is recorded as the time information of each image forming process in the recording portion 64, the CPU 61 calculates the difference between the time information (completion time) read from the recording portion 64 and the present time as the elapsed time when performing the processing of S3.

When the elapsed time in S3 is within the predetermined period of time, the CPU 61 reads the function information of that image forming process from the recording portion 64 (S5), and judges whether or not the switching time set in advance to the read function is 0 (S6). When the switching time that has been set in advance is not 0, the CPU 61 calculates a time T by adding the switching time that has been set in advance to the completion time of that image forming process (S7), and compares the calculated time T to the time information Tmax (S8) When the calculated time T is later than the time information Tmax, the CPU 61 sets the value of the time T to the contents of the time information Tmax (S9).

The switching time set in advance for each function used to calculate the time T in S7 may also be increased or decreased based on the history of the image forming process of each function.

When the elapsed time from the completion time until the present time is recorded in an updated manner as the time information of each image forming process in the recording portion 64, the CPU 61 adds the switching time after subtracting the time information (elapsed time) from the present time when performing the processing of S7. Also, when the completion time recorded as the time information of each image forming process in the recording portion 64, the CPU 61 adds the switching time to the time information (completion time) read from the recording portion 64 when performing the processing of S7.

The CPU 61 repeatedly executes the processing of the aforementioned S3 to S9 for all of the respective image forming process recorded in the recording portion 64, and of the times in which the switching time has been added to the completion time with respect to each of the individual or plurality of image forming process whose elapsed time is within the predetermined time, the latest time is set to the time information Tmax. The CPU 61 sets the time information Tmax determined in this manner to a counter 66 as the switching time (S10), and when the counter 66 has counted up, the current time is considered to have reached the switching time and the CPU 61 switches to the power-saving mode.

When the next image forming process has started before switching is made to the power-saving mode following completion of image forming process, the CPU 61 halts the operation of the counter 66 and the switching time timer is made invalid.

Figure 5:
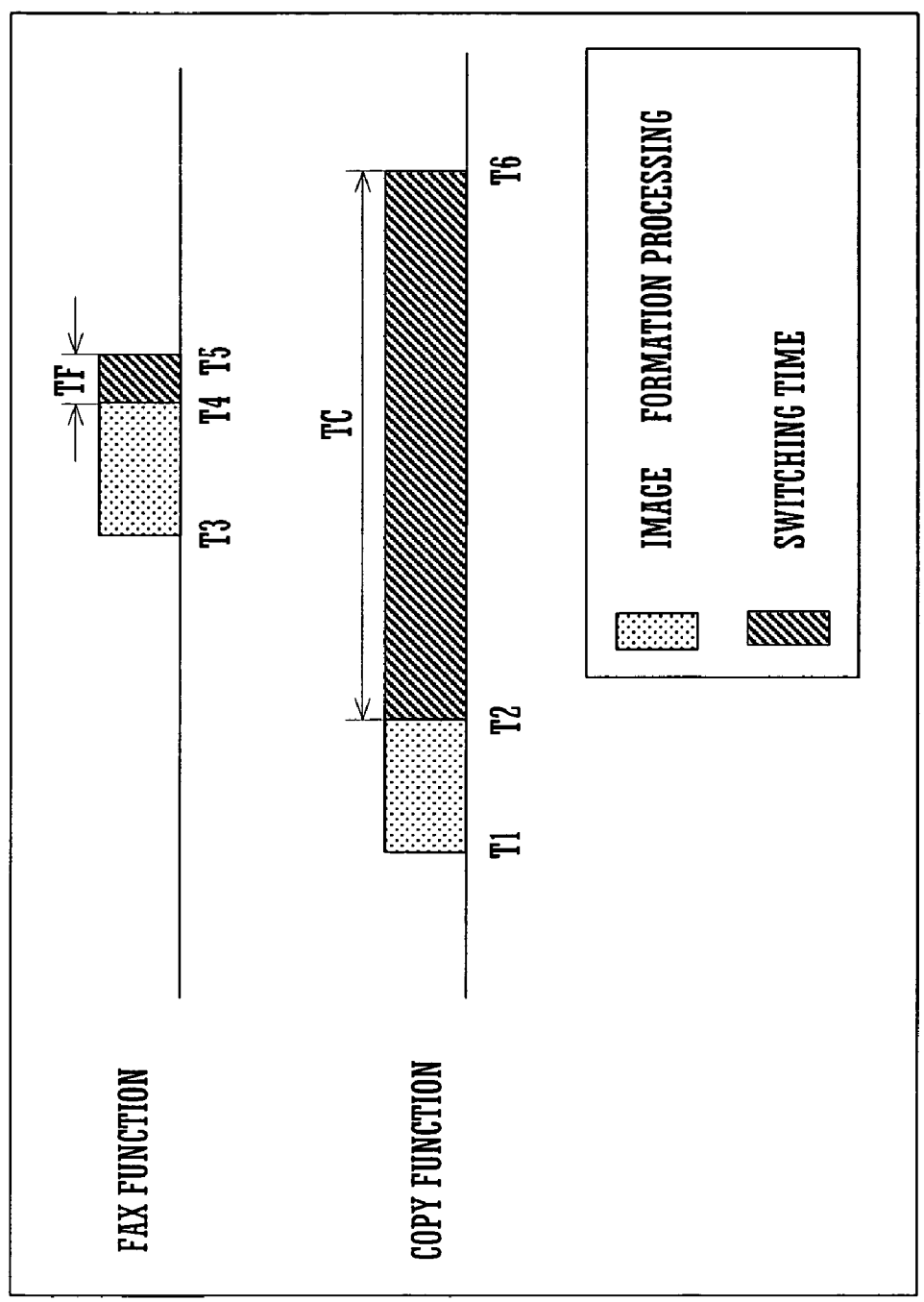
FIG. 5 shows a specific example of a switching time determination method in the aforementioned MFP.

With the processing described above, for example, as shown in FIG. 5, in a case in which the image forming process of the copy function started at a time T1 is completed at a time T2, and the image forming process of the fax function started at a time T3 is completed at a time T4 before a predetermined time has elapsed, a time T6 is set as the switching time when the time T6, in which a switching time TC that has been set in advance for image forming process of the copy function is added to the time T2, is later than a time T5, in which a switching time TF that has been set in advance for image forming process of the fax function is added to the time T4.

Thus, for example, after one instance of a plurality of image forming process of the copy function that a user who has gone to the MFP 10 executes has completed, even if fax data is input to the MFP 10 from an external facsimile and the image forming process of the fax function has been executed during operation of the MFP 10 for preparation of the next image forming process of the copy function, no switch is made to the power-saving mode when the comparatively short switching time set in advance for the image forming process of the fax function has elapsed. Thus, if the user completes operation of the MFP 10 by the time that the comparatively short switching time set in advance for the image forming process of the copy function has elapsed, it is possible to immediately start the next image forming process of the copy function, and the convenience of the user is not impaired.

Also, as shown in FIGS. 6A and 6B, by setting not only the switching time after completion of the image forming process for each function, but also setting the switching time after occurrence of operation of the MFP 10 related to the image forming process for the copy function, it is possible to determine the timing at which switching should be made to the power-saving mode by taking into consideration not only the history of the completed image forming process but also the history of operation of the device, and the convenience of the user can be further improved.

Figure 7:
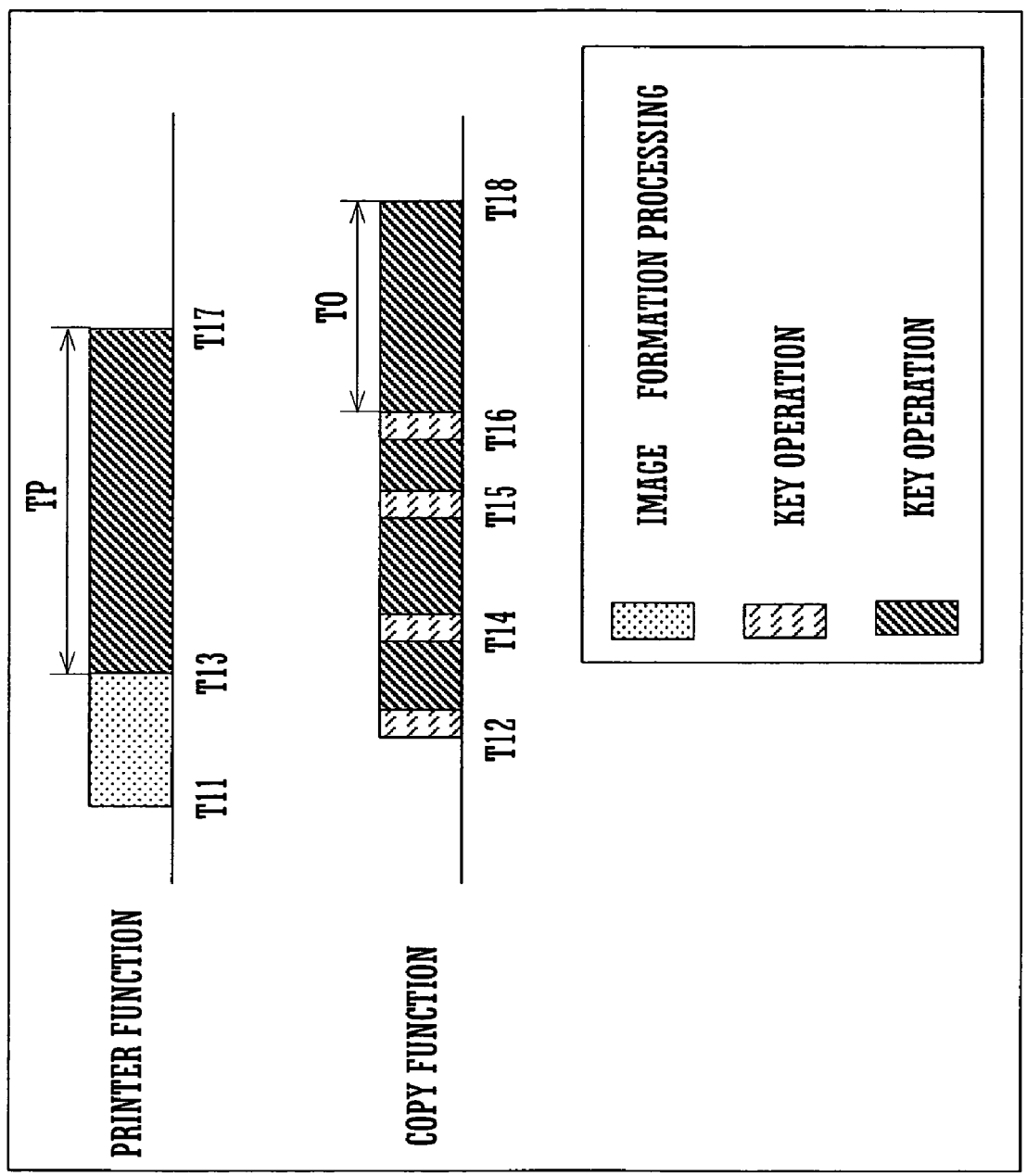
FIG. 7 shows a specific example of a switching time determination method in an MFP that is an image forming apparatus according to another embodiment of this invention.

For example, as shown in FIG. 7, while a user who has gone to the installation location of the MFP 10 is performing operation of the MFP 10 such as input of image forming conditions for the image forming process for the copy function or placing the manuscript, when the image forming process for the printer function started at a time T11 is completed at a time T13, before a time T17, in which a switching time TP that has been set in advance for the image forming process for the printer function is added to the time T13, operation of the MFP 10 is performed at times T14 to T16, and when a time T18, in which a switching time TO that has been set in advance for the operation related to the image forming process of the copy function is added to the time T16, is later, the time T18 is set as the switching time.

Accordingly, even if print data is input to the MFP 10 from an external terminal device and the image forming process of the printer function has been executed while a user is performing operation of the MFP 10 related to image forming process of the copy function, no switch is made to the power-saving mode when the comparatively short switching time set in advance for the image forming process of the printer function has elapsed. Thus, the user can perform the next operation of the MFP 10 or execute the start of the image forming process of the copy function before the comparatively long switching time that has been set in advance for the operation related to the image forming process of the copy machine has elapsed.

The key switch 51 provided in the operating portion 5 corresponds to a detection member of this invention. Also, as the operation of the MFP 10 prior to start of the image forming process of the copy function, other than the key switch 51, it is possible to include an opening and closing operation of a document cover in the image reading portion 1. In this case, as the detection member of this invention, a member that detects the opening and closing operation of the document cover is provided in the document rest.

Also, when in the power-saving mode, the MFP 10 may reduce not only the amount of power supplied to the image forming portion 4; it may also reduce the amount of power supplied to other equipment in the MFP 10.

Further, a configuration may be adopted in which, when performing image forming process for the printer or fax functions with respect to print data or fax data treated as personal and confidential, because image forming process is performed after waiting for the user to receive the data to enter their own identifying information, a comparatively long switching time is set with the input time of print data or fax data treated as personal and confidential as a basis, time information and operation information for the input of print data or fax data treated as personal and confidential are recorded along with time information and processing information for the image forming process in the recording portion 64.

The invention claimed is:

1. An image forming apparatus, comprising:
   an image forming portion that selectively performs a first kind of image forming process or a second kind of image forming process, the first kind of image forming process involving a manual operation of the image forming apparatus by an operator, the second kind of image forming process not involving the manual operation;
   a control circuit for controlling power supply to the image forming portion, the control circuit switching the image forming portion to a power-saving state when a predetermined switching time period has elapsed during which either one of the first and second kinds of image forming processes is not performed; and
   a recording circuit for recording time information and function information of an operation performed by the image forming portion, the time information specifying when the image forming portion completes the operation, the function information specifying what kind of operation it is,
   wherein a first switching time period is determined in advance for the first kind of image forming process, and a second switching time period is determined in advance for the second kind of image forming process,
   wherein the control circuit selectively uses either one of the first and second switching time periods, based on function information of either one of the first and second kinds of image forming processes in which the time information recorded in the recording circuit is within a predetermined period of time,
   wherein the control circuit uses either one of the first and second switching time periods which corresponds to the most frequently used one of the first and second kinds of image forming processes, and
   wherein when either one of the first and second kinds of image forming processes is completed during a corresponding one of the determined first and second switching time periods, the control circuit calculates switching times so that switching is to be made to the power-saving state, based on a switching time period corresponding to the function information for each image forming process and on the time information recorded in the recording circuit, and switching is made to the power-saving state when the later of the calculated switching times has been reached.

2. The image forming apparatus according to claim 1, wherein the control circuit uses the first and second switching time periods based on respective numbers of the first and second kinds of image forming processes performed within the predetermined time period.

3. The image forming apparatus according to claim 1, wherein the control circuit uses the first and second switching time periods based on the number of the first kind of image forming process performed within the predetermined time period.

4. The image forming apparatus according to claim 1, further comprising a detection member that detects operation of the apparatus before the start of processing,
   wherein the switching time period is set for each operation of the apparatus before the start of processing, and
   wherein the recording circuit also stores operating time information in which a time of operating occurrence for each operation detected by the detection member is specified, and the control circuit also calculates the switching time at which switching should be made to the power-saving mode based on the switching time period corresponding to each operation and the operating time information recorded in the recording circuit.

5. An image forming method comprising the steps of:
   selectively performing a first kind of image forming process or a second image kind of forming process in an image forming portion, the first kind of image forming process involving a manual operation of the image forming apparatus, the second kind of image forming process not involving the manual operation;
   controlling power supply to the image forming portion by switching the image forming portion to a power-saving state when a predetermined switching time period has elapsed during which either one of the first and second kinds of image forming processes is not performed;
   recording time information and function information of an operation performed by the image forming portion, the time information specifying when the image forming portion completes the operation, the function information specifying what kind of operation it is;
   determining, in advance, a first switching time period for the first kind of image forming process, and determining, in advance, a second switching time period for the second kind of image forming process;
   selectively using either one of first and second switching time periods for each of the first and second kinds of image forming processes, based on function information of either one of the first and second kinds of image forming processes in which the time information is within a predetermined period of time; and
   using either one of the first and second switching time periods which corresponds to the most frequently used one of the first and second kinds of image forming processes,
   wherein when either one of the first and second kinds of image forming processes is completed during a corresponding one of the determined first and second switching time periods, the switching times are calculated so that switching is to be made to the power-saving state, based on a switching time period corresponding to the function information for each image forming process and on the recorded time information, and switching is made to the power-saving state when the later of the calculated switching times has been reached.

6. A computer-readable medium having instructions stored thereon, such that when the instructions are read and executed by a processor, the processor is configured to perform the steps of:
   selectively performing a first kind of image forming process or a second kind of image forming process in an image forming portion, the first kind of image forming process involving a manual operation of the image forming apparatus, the second kind of image forming process not involving the manual operation;
   controlling power supply to the image forming portion by switching the image forming portion to a power-saving state when a predetermined switching time period has elapsed during which either one of the first and second kinds of image forming processes is not performed;
   recording time information and function information of an operation performed by the image forming portion, the time information specifying when the image forming portion completes the operation, the function information specifying what kind of operation it is;

determining, in advance, a first switching time period for the first kind of image forming process, and determining, in advance, a second switching time period for the second kind of image forming process;

selectively using either one of first and second switching time periods for each of the first and second kinds of image forming processes, based on function information of either one of the first and second kinds of image forming processes in which the time information is within a predetermined period of time; and using either one of the first and second switching time periods which corresponds to the most frequently used one of the first and second kinds of image forming processes, wherein when either one of the first and second kinds of image forming processes is completed during a corresponding one of the determined first and second switching time periods, the switching times are calculated so that switching is to be made to the power-saving state, based on a switching time period corresponding to the function information for each image forming process and on the recorded time information, and switching is made to the power-saving state when the later of the calculated switching times has been reached.

* * * * *